Feb. 28, 1933. E. C. BULLARD 1,899,608
METAL WORKING
Filed July 8, 1932 3 Sheets-Sheet 1

INVENTOR.
EDWARD C. BULLARD
BY
ATTORNEY.

Feb. 28, 1933. E. C. BULLARD 1,899,608
METAL WORKING
Filed July 8, 1932 3 Sheets-Sheet 2

INVENTOR.
EDWARD C. BULLARD
BY
ATTORNEY.

Feb. 28, 1933.  E. C. BULLARD  1,899,608
METAL WORKING
Filed July 8, 1932  3 Sheets-Sheet 3

INVENTOR.
EDWARD C. BULLARD
BY
ATTORNEY.

Patented Feb. 28, 1933

1,899,608

UNITED STATES PATENT OFFICE

EDWARD C. BULLARD, OF SOUTHPORT, CONNECTICUT, ASSIGNOR TO THE BULLARD COMPANY, A CORPORATION OF CONNECTICUT

METAL WORKING

Application filed July 8, 1932. Serial No. 621,398.

This invention relates to a method of turning metal. The tool consists of one or more elongated blades suitably formed and disposed upon a support and adapted to have the cutting action shift relatively slowly along each blade. Broadly speaking, the method is one in which the work is rotated on its own axis at cutting speed, while a relative movement between work and tool subjects the surface to be turned to the shearing or skiving action of one or more of the elongated blades of the tool. The apparatus preferably used may consist of means for rotating work at cutting speed and a moving support for the tool arranged to feed its blades in such manner as to perform the method outlined.

Turning is sometimes, but incorrectly spoken of as metal cutting which implies an actual shearing action as distinct from "splitting" which forces material apart along its grain structure with a wedging action and which is likewise distinct from sawing in which the particles are actually pushed or wedged off. Single point tools act in this wedging manner. The chips from such tools are a series of pieces scraped or wedged off the main body and are badly deformed and crushed. A scientifically built cutting tool should on the other hand be so constructed that it would act as a plow shearing the metal chip from the work and pushing it to one side, allowing the cutting edge to advance relative to the work. When this condition obtains, the cutting angle should be such that the chip slips instead of crumbles, and it flows from the work in a continuous, spirally-wound ribbon.

With the advent of production turning, there have been several factors which have assumed utmost importance, namely:

1. Length of tool life without regrinding.
2. Maintenance of smooth surface finish and accurate dimensions.
3. The economical removal of a large amount of material in a short time with the least consumption of power, and without sacrificing tool life and surface finish. With these factors in mind, this invention presents an entirely new type of shear cutting tool and a method and apparatus suitably developed for the most efficient use of this tool.

It is, therefore, among the general objects of the present invention to provide for both internal and external metal turning in such a way that a smooth shearing action is performed so as to insure a smooth finished surface with maximum power efficiency and tool life.

The present invention is particularly concerned with the adaptation of its principles to the turning of the harder metals such as steel and iron, although they may be applied with greater facility to the turning of softer metals, such as aluminum. Various attempts have been made heretofore to subject soft metals, such as brass, to the successive turning action of several blades but these have never proved successful even at slow speeds and in connection with the soft metals. No attempt has been made, prior to this invention so far as I am aware, to overcome the numerous difficulties encountered in applying these principles to high speed operations upon the harder metals. Among the reasons for the unsatisfactory results obtained from the prior efforts was the failure to provide any clearance angle for the cutting edge with the result that friction, and thus over-heating and burning out of the tool edge, developed and the unused tool surface was subjected to destructive abrasion. Another cause of the failure of the early, abandoned efforts was the lack of a proper rake angle which, alone or in combination with the clearance angle, has an important bearing upon the efficiency and effectiveness of this type of cutting action. Experimental work has shown that it is absolutely necessary to provide appropriate rake and clearance angles. The invention further contemplates the arrangement of the cutting blades at a suitable angle to the work axis in order that the shearing action referred to may properly take place. It must be borne in mind that the setting of the cutting edge at an angle with the work axis affects both the rake and clearance angles, and the actually effective rake and clearance angles depend upon the angle at which the blade is set.

The invention is obviously susceptible of wide variations and while in some instances the blades may be arranged to pass tangentially of the periphery of the work, in other instances a circular series of blade edges may enter or surround a circular work piece to effect turning of either an interior or exterior surface thereof. The blade edges are preferably in parallel and each blade has a decided clearance angle so as to avoid undue heating and friction, and each preferably includes an angular rake surface which may terminate in a well rounded or circular surface so as to properly discharge chips without undue strain or distortion.

The method of the invention may be briefly defined as consisting in subjecting the work while rotating at cutting speeds to the action of the tool, the blade edge or edges of which are arranged to approach the work surface (either internal or external) at a major angle with respect to the axis of the work and at a relatively slow speed so that the cutting action passes along the blade from point to point axially of the work and so that no one point of the blade is subjected to a continuous strain or a continuous heat for an excessive time interval.

The apparatus employed varies with the specific embodiment, but it consists in general of means for rotating the work at cutting speed and means for moving the tool and work relative to each other to perform the method outlined. However, it will be understood that movement of the blades and the work is a matter of relationship and if desired the blades may be held stationary while the work both rotates and moves bodily to in effect produce a relative shifting of the blades with respect to the work surface.

Other objects and advantages of the invention will appear from a detailed explanation of several forms of the same which will now be given in conjunction with the drawings. It will be understood that the embodiments of the invention herein disclosed are merely some of the many examples which might be made illustrating the inventive concept and that numerous changes and modifications and the full use of equivalents may be resorted to in carrying out the invention and for adapting it for a variety of special types of work. This application is a continuation in part of applicant's copending application Serial No. 556,386 filed Aug. 11, 1931, and is a companion application to application No. 556,387, filed August 11, 1931, to which has been transferred certain claims for purposes of interference. Claims to the apparatus and the tool are about to be filed in divisional cases of the present application. In the drawings:

Figure 1:
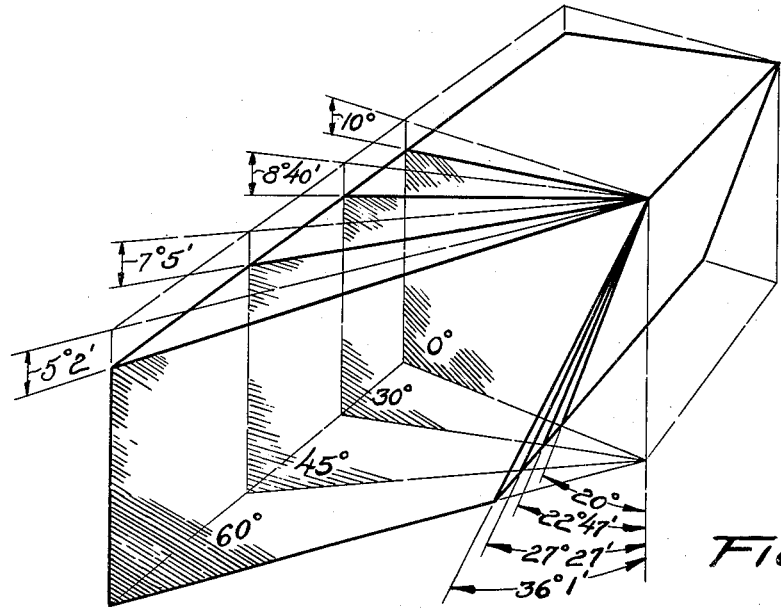
Fig. 1 is a diagrammatic view illustrating the relation of clearance and rake angles to the angle of incidence of the tool blade to the work.

Returning now to the dependency of the effective rake and clearance angles upon the angle of incidence of the tool, i. e. the angle at which the tool blade approaches the work surface, reference may be had to the diagram, Fig. 1, in which planes have been struck through the tool block at angles of 0°, 30°, 45°, and 60° to the transverse axis of the blade. If we assume that the cutting edge of the blade is tilted at these angles of incidence to the axis of the work, it will be apparent that the planes indicated will be perpendicular to the work axis. Thus when the cutting edge is parallel with the work axis there is a zero angle of incidence and the 0° plane will be perpendicular to the work axis, while when the cutting edge is at 60° to the work axis there will be a 60° angle of incidence and the 60° plane will lie perpendicular to the work axis. The tool is indicated as being formed from a rectangular bar of tool stock which is ground to provide a normal rake angle of 20° and a clearance angle of 10°, as shown in the 0° plane. As the angle of the direction of feed or angle of incidence increases, the effective clearance angle decreases and the effective rake increases, the latter change being at a greater rate than the former. While the angularity of the tool to the work increases, the thickness of material between the rake and clearance surfaces diminishes, thus presenting, in effect, an increasingly sharper shearing edge. It will be noted at the same time that the mass of material in line with the direction of cut, which is measured along a diagonal from the cutting edge to the lower back edge of the blade increases with the angle of incidence so that the mass of material backing the cutting strain increases as the angle increases. The following table shows the relation of effective clearance and rake angles to various angles of incidence with a tool ground to normal 20° rake and 10° clearance angles:

| Angle of incidence | Effective rake | Effective clearance |
|---|---|---|
| 0° | 20° | 10° |
| 30° | 22° 47′ | 8° 40′ |
| 45° | 27° 27′ | 7° 5′ |
| 60° | 36° 1′ | 5° 2′ |

Minor angles of incidence of the tool to the work have been found to be less feasible than a major angle especially for the smooth, efficient and low power consumption of high speed turning of hard materials. I have also found that when minor angles of incidence are employed, the desired shearing or skiving action is largely lost and is replaced by a wedging, chip deforming gouge from which large heat losses ensue and undue wear and strain follow. This results in increasing the normal power requirement and decreasing the smoothness of the finish.

Tests have shown that the most appropriate angle of incidence depends to a considerable extent upon the material hardness. For instance, with chrome nickel steel with a Brinnel hardness of 207, an angle of from 50° to 60° has been found to work out the best. In such tests a ground or normal clearance angle of 10° and a normal rake angle of 20° were successfully employed. In any given situation conflicting factors must be considered and the angles adopted must be in the nature of a compromise and must be those which best meet the specific requirements as a whole. Thus to a large extent the angle of incidence is selected as the lowest angle which will insure the smooth sidewise slipping of the chip and will permit a true shearing or peeling action. It will be apparent that if too great an angle is adopted, approaching 90°, the width of the cut will be so reduced that the operation will become inefficient and the revolution marks will become pronounced. At the same time in working harder metals a relatively large angle should be adopted to reduce the width of the cut and thus avoid overburdening the machine and cutter. The kind of material being worked thus largely controls this consideration. However, the rake angle also has its effect on chip discharge, the greater this angle the more satisfactory is the chip discharge. However, an increase of the rake will reduce the material of the cutter between the rake and clearance surfaces and an excessive rake angle should, therefore, be guarded against.

A controlling factor in determining the requisite clearance angle is the relation between the rate of feed of the tool across the work and the speed of rotation of the work. In turning machines, regardless of whether movement is mutual between work and tool or is confined to one or the other of these elements, a spiral groove or revolution mark is made, the depth of which is determined by the tool setting while its pitch is determined by the ratio of the bodily relative feed between the tool and work to the speed of rotation of the work. If the tool feed is fast in relation to work rotation and the revolution marks are deep, a relatively great clearance angle is required to prevent contact of the finished work surface with the clearance surface. On the other hand a slow tool feed will result in overlapping of the revolution marks and a smaller clearance angle is then permissible.

So as to relieve any one blade of the danger of becoming overheated and burned, due to taking too deep a cut, the improved cutter preferably consists of not one blade but a series of blades or cutting edges, each successive one set higher so as to remove a further amount of material. Therefore, it can be seen that if each blade removes fifteen thousandths of an inch from the work surface, it would require four blades, each successive one set .015″ higher than the preceding one to remove approximately $\frac{1}{16}$ inch of metal. In the present tool, the cutting edges are preferably arranged in accordance with a given formula, as will be explained, so as to have each successive cut coordinated with the preceding ones whereby the spiral ridge left by the action of the first cutter is wholly eliminated by the subsequent cutters, thereby leaving a finished, smooth surface.

Figure 2:
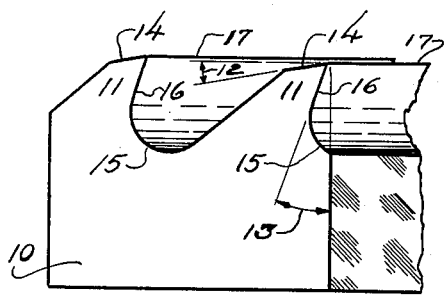
Fig. 2 is a detailed view of a preferred form of blade.

Referring now to Fig. 2, there is shown one preferred embodiment of the tool which, while bearing a general similarity to the tool diagrammatically illustrated in Fig. 1, varies therefrom in a number of particulars. By way of illustration, the tool consists of a base block 10 which is formed with a pair of blades 11, each of which has a suitable clearance angle of, say, 10°, measured at 12 and a rake angle, of say 20°, measured at 13, it being understood that these angles are simply suggested for illustration and that their magnitudes may depart from the values herein specified to suit particular requirements. Their effective values will automatically vary, furthermore, in accordance with the angle of incidence of the tool. Behind the clearance surface 14, the forward blade slopes rearwardly and is developed into or merged with a curling surface 15 which extends into and meets the rake surface 16 of the rear blade. A similar relation is brought about between the rear blade of one pair and the front blade of another pair. By this construction of curl surface, the continuous long ribbon or fillet of metal removed by the blade edge 17 is curled so as to contribute to the ease of its discharge sidewise from the tool. The matter of chip discharge is a highly important feature of the invention and one upon which a great deal of its success and efficiency depend. By so constructing the blade as to accomplish rapid and easy chip disposal, the heat generation and power losses due to the mutilation or crumpling of the chip are avoided and the danger of the packing of the chips against the rake surface, whereby they would cause chattering and uneven work, is avoided.

Figure 3:
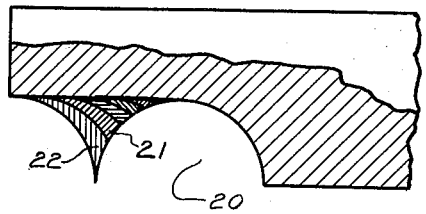
Fig. 3 is a magnified view of a work surface illustrating diagrammatically the relayed action of the successive tool blades resulting from a predetermined blade spacing.

While the invention in all of its aspects is not confined to the use of plural blade edges, such tools have been found advantageous, particularly when it is desired to remove considerable metal by a single pass of the tool. In this case at least a portion of the blade edges may be stepped so that each will remove a proportionate amount of metal and will relay the cutting action to the following blade so as to successively reduce the work. Another advantage in the use of plural blades, is the fact that they may be set so that a revolution mark made by one blade will be reduced by the following blades whereby the final surface of the work will be free of such marks. To accomplish this purpose, the blades should be appropriately spaced and perferably set in accordance with a formula based upon the feed of the tool, speed of rotation of the work and the number of blades used. When the correct spacing is used, it will be found that the successive blades will take cuts so related to the cuts of the preceding blades as to substantially completely remove revolution marks. The formula for determining the correct spacing may be expressed as follows:

$$S = XF + \frac{F}{Y}$$

Where S is the spacing of the cutter edges, F is the distance advanced by the cutter for each revolution of the work, X is a constant to insure adequate chip disposal space and Y is the number of blades. F is, of course, determined by dividing the feed of the cutters into inches per minute by the R.P.M. of the work. The illustration of Fig. 3 is based upon work acted upon by eight properly spaced blades. The first blade will cut a series of grooves 20 leaving a peaked ridge, such as shown, between each pair of grooves. The second blade will remove the shaded portion 22 of the ridge while the next blade will remove the portion 21 and so on down, each successive blade taking its successive portion of the ridge until the desired evenness of surface is achieved.

Figure 4:
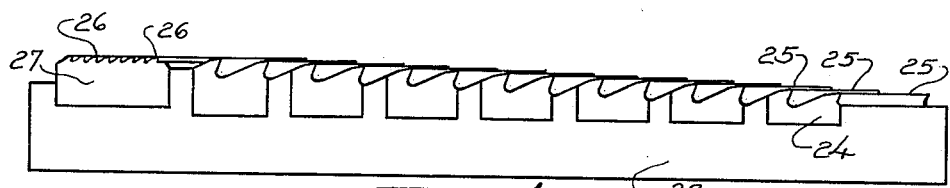
Fig. 4 illustrates one specific form of flat tool embodying the invention.

As an illustration of a complete tool formed in accordance with the invention, reference may be had to Fig. 4, in which the tool includes a base block 23 having mounted therein the blade units 24, each of which may, by way of illustration, be formed in accordance with Fig. 2 and in this case each of the blade edges 25 of these units will extend above the preceding edge on the right to form a whole series of stepped blades, each of which is adapted to remove a given amount of material. By this arrangement a single pass of such a tool across the work may be made to reduce a total amount of material equalling the sum of the steps of the several blades. A set of finishing blade edges 26 may also be mounted in the base 23. They are shown as being formed integral with a finishing blade block 27. The finishing blades are likewise of the character and form shown in Fig. 2, although they may conveniently be of less depth than the blades 25 since they will be called upon to remove only a small amount of metal. They are preferably spaced in accordance with the above formula so that the relay action thereof will result in the removal of all revolution marks. If desired, the blade pieces may be adjustable and may be removably positioned in the base 23 or may be permanently secured therein or formed integral therewith. Obviously, the blade edges may depart from the rectilinear, if desired, so that they may act as contour cutters. The blades may also be set to have their cutting edges lie in a plane or planes at an angle to that of the axis of the work so as to perform taper turning. The blade edges preferably lie across the block at an angle of approximately 35° to its longitudinal axis so that when the block is moved across the work surface transversely to the direction of the work axis, the angle of incidence of the edges will be substantially 55°. As previously indicated, however, this angle may well vary to suit particular circumstances. The angle to the direction of movement of the blade should be kept below 45° (i. e. it should be a minor angle) preferably between 30° and 40° so that the angle of incidence may be major.

By the use of this type of tool, it is possible to provide maximum tool life, since the burden on each blade may be relieved by the fact that the work is being operated upon by as many roughing cutters as may be required and as many finishing cutters as may be required, all in a single pass of the tool. No one blade will thus be subjected to continuous action or overburdening by too deep a cut. Furthermore, from a single chucking of the work, the tool will operate to both rough and finish the work at a single pass of one tool block.

Figure 7:
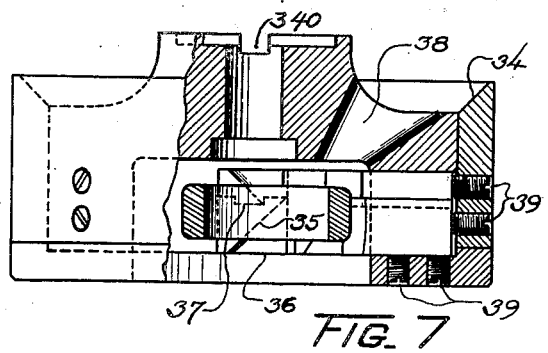
Fig. 7 is a side elevation, partially broken away, showing a circular type of cutter, formed in accordance with the present invention, which is adapted to turn the outer face of work.
Figure 8:
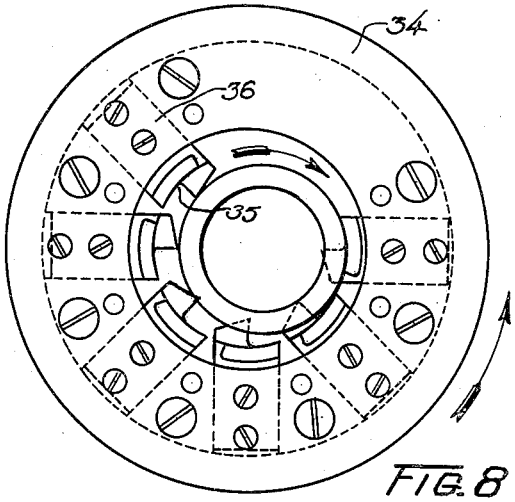
Fig. 8 is an end elevation of the form of cutter shown in Fig. 7.

Referring to Figs. 5 to 8, inclusive, it will be observed that the invention also contemplates a departure from the flat reciprocating type of tool block and tool having edges lying in parallel planes. In these modified forms of the invention, the blade edges are arranged about a central axis. In that form of the invention shown in Figs. 5 and 6, the blades face outwardly, while in the tool shown in Figs. 7 and 8, the blades face inwardly; the former tool being adapted to turn the inside surface of a hollow work piece, while the tool shown in Figs. 7 and 8 is designed to turn the outer face of a rotating work piece.

Figure 5:
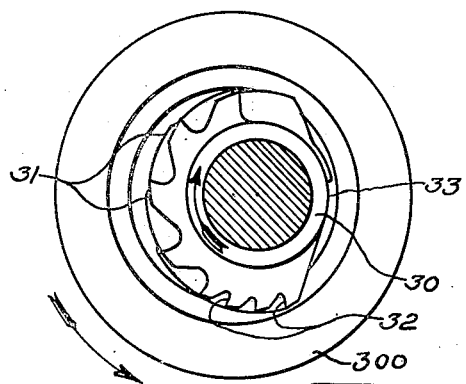
Fig. 5 is an end elevation of one form of an internally cutting tool made in accordance with the present invention, the cutter being shown in relation to a work piece.
Figure 6:
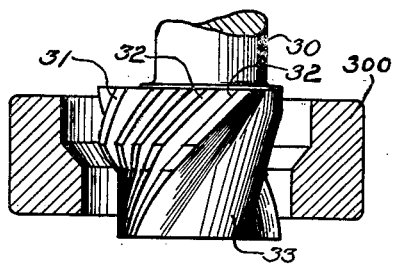
Fig. 6 is a side elevation of the form of cutter shown in Fig. 5.

With particular reference to Figs. 5 and 6, it will be observed that the hub or body 30 of the tool may carry a group or series of outwardly facing roughing blades 31, each of which extends a successively greater radial distance from the center so that as a whole they constitute a spiral series of blades. In the use of this tool it will be mounted upon a spindle adapted to extend into the opening within the work piece 300 and arranged eccentrically with relation to the axis of rotation of the work. The work will be rotated at a cutting speed in the direction of the outer arrow in Fig. 5, for example, while the tool will be rotated slowly in the opposite direction. By rotation of the tool body on its own axis, the blades will successively be brought into the path of, and will engage, the rotating work surface at a tangent thereto and at successively different depths. Each blade of the series, furthermore, will have the cutting action progressively shifted along its edge as different portions of the blade are brought into the plane passing through the axes of the cutter and work so that the cutting action will be of the same relayed character as hereinbefore discussed. The body 30 also may be provided with a series of finishing blades 32, the corresponding portions of which are preferably at a uniform distance from the tool axis and which are desirably spaced in accordance with the formula hereinbefore outlined so that upon rotation of the body, they will successively reduce the revolution marks and leave a finished surface. The first finishing blade may either be at the same radial distance from the tool axis as the final roughing blade or may be at a slightly greater distance so as to take a light, continuous cut.

Figure 11:
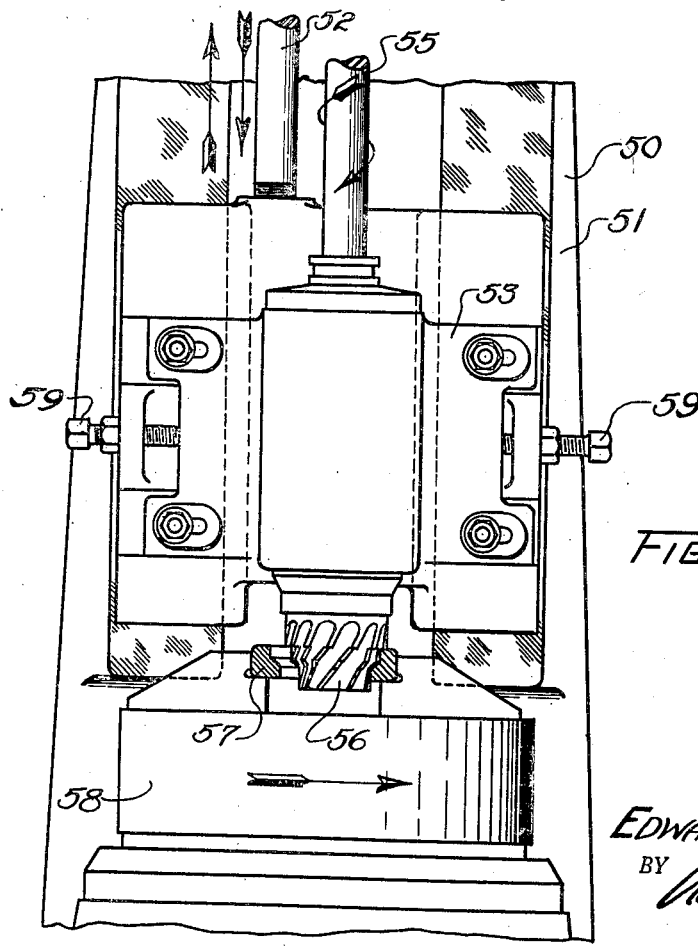

The body 30 is provided with a bladeless area 33 which provides a flat side, the surface of which is within the arc traced by the first or lowest blade. In the operation of this type of tool, it is placed in the work by axial movement of its supporting spindle into the work by suitable apparatus such as shown in Fig. 11, the axis of the tool being, as before stated, eccentric to or out of coincidence with the axis of the work. Such movement of the tool axially into the work is timed in such manner that the flat surface 33 is at this time nearest the work so that, as indicated in Fig. 5, the movement may be freely accomplished without the tool striking the work. It will be readily seen that if after such placing movement, the tool is rotated on its own axis in the direction of the inner arrow (Fig. 5), the roughing blades will successively strike the internal surface of the work at a tangent thereto and such action will result in a shearing relay action similar to that discussed in connection with the action of the tool shown in Fig. 4.

Each of the blades 31 is preferably arranged and designed in accordance with the teachings hereinbefore made. Each is provided with suitable rake and clearance angles. By reference to Fig. 6, it will be seen that the invention is not confined to the use of blades whose edges are at all points at the same radial distance from the axis of the tool but the blades may be formed in steps or may be tapered so that by their revolution they will produce a correspondingly stepped or tapered internal surface on the work. It will be appreciated, furthermore, that the blades need not have a continuous taper toward one end. The flat sided portion of the body 30 makes it possible to enter the tool within the work even though the blades may have a contour which is generally concave or convex. Thus by a simple rotation of such a tool through a single revolution, it can produce and finish undercut surfaces, or surfaces which taper in opposite directions toward an intermediate point on the work.

With particular reference to Figs. 7 and 8, it will be seen that a similar tool is comprehended by the invention in which the blades extend inwardly. In this instance, the first roughing blade terminates at a greater radial distance from the axis of the tool body than the subsequent stepped blades or finishing blades. In this form of the invention a bladeless area is also provided to permit positioning of the cutter and after such positioning it may be slowly rotated so as to carry the cutting edges successively into operation on the external surface of the revolving work. In Fig. 8 the inner and outer arrows indicate, respectively, the directions of rotation of the work, and cutter and the parts are here shown in their relation just as the first cutter comes into operation. As in the case of the tool shown in Figs. 5 and 6, the apparatus shown in Fig. 11 is adapted for the employment of this tool. In this form of the invention a cup-like, hollow body 34 is provided with blades extending inwardly thereof. The cutting edges are illustrated as being carried by separate inserted blade elements 36, each element having an elongated blade edge preferably disposed at a major angle with respect to the work axis. The blades 36 are shown as being formed in two parts or sections, one above the other, and connected by a dovetail joint 37. The upper section has its cutting edge 35 inclined in one direction to the work axis while the lower section has its cutting edge inclined in the opposite direction. This provides for the upward discharge of the chips removed by the upper section and the downward discharge of chips removed by the lower section. The edges 35 may be suitably formed to follow the contour of the finished work piece and for this purpose may have portions adapted to extend over and under a work piece of the type shown in Fig. 7 so as to provide the rounded edges shown and also finish the top and bottom faces. The employment of these undercutting edges is made possible by the bladeless portion of the cutter which may be opposite that portion of the work closest to the path of the cutters when the tool is moved downwardly over the work piece. A central opening 340 may be provided through the tool body to permit attachment of the tool in a convenient way to the spindle of a machine of the type shown in Fig. 11. Apertures 38 may be provided through the tool body to permit the introduction of a cutting lubricant or cooling medium for the blades during the cutting operation. The blades may be adjustably retained within the tool body by means of set screws 39 passing through the bottom and side wall of the body.

While Figs. 4 to 8 illustrate various specific forms of the invention, it will be understood that the invention is in no way restricted to the specific structures illustrated. For instance, the number and arrangement of the roughing and finishing blades may be varied and in any form of tool either inserted blades or integral blades may be employed. Furthermore, the contour of the work may be formed by a series of single, continuous blade elements as in Figs. 5 and 6 or by a series of sectional blade elements as shown in Figs. 7 and 8 and if desired the tool block may be formed by compounding a group of individual cutter elements each having a series of full blades, or each having a series of portions of full blades.

Figure 9:
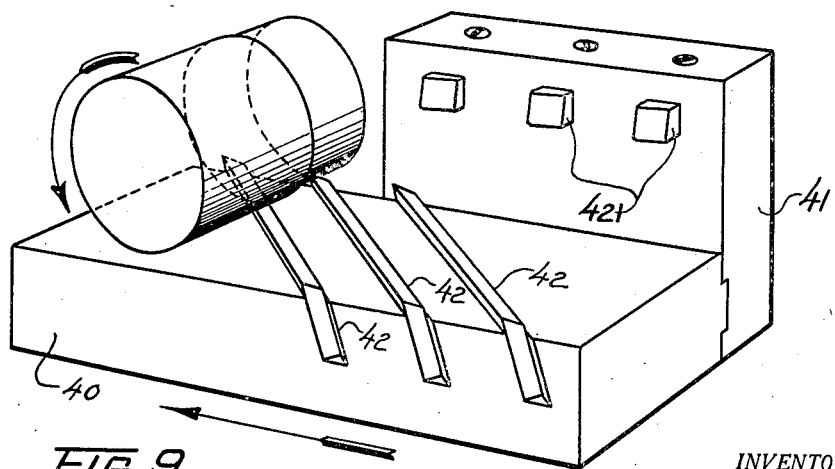
Fig. 9 is a perspective view of a further application of the invention.
Figure 10:
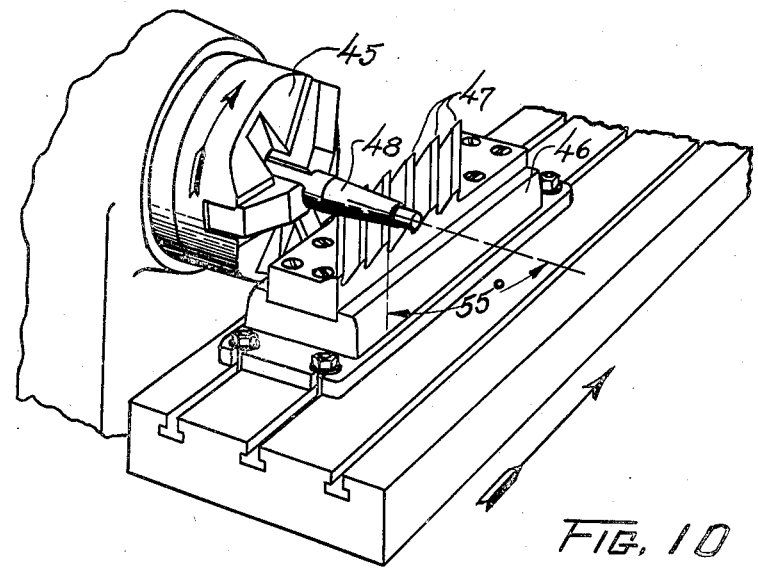

Referring now to Fig. 9, it will be observed that the modification of the invention herein disclosed is particularly adapted for the turning of a plurality of angularly related surfaces of a work piece. In the specific illustration, the tool is designed for turning portions of a cylinder such as the side walls and the end of a piston blank. The tool consists of a block which is L-shaped in cross section, the base 40 of the block lying horizontal, similar to the base of the cutter in Fig. 4. Associated with the horizontal base 40 is an end finishing or turning base 41 disposed vertically. The two bases may be connected, if desired, in any suitable way. The horizontal base carries elongated, angularly disposed cutting blades 42 similar to those described in connection with Figs. 2 and 3. Each blade thereof has a clearance angle and a rake angle and preferably is arranged to strike the work at an angle of incidence of between 50° and 60°. The blades on the horizontal base, therefore, lie with respect to the longitudinal axis of the base at a complementary angle of 40° to 30°. The blades 421 carried by the vertical block may conveniently be of the ordinary end-facing type, substantially rectangular in cross section. The mode of operation followed in the use of this tool may be identical with that discussed in connection with the tool of Fig. 4 and the apparatus employed may be similar to that illustrated in Fig. 10 of the drawing and to be subsequently described. From a consideration of this form of the invention, it will be appreciated that the cutting action is substantially the same as that hereinbefore discussed in detail.

It will be noted that in Fig. 9 only three blades are provided in each group; however, the number and arrangement of roughing and finishing blades may be widely varied without departing from the scope or spirit of the invention. When three blades are employed, as illustrated, the first blade serves as the original roughing cut blade, while the second blade is stepped up therefrom so as to perform a second cut. The second and third blades may be arranged to lie in the same plane so that the third blade acts merely as the finishing blade and is arranged to reduce or remove revolution marks which may have been produced by the preceding blade or blades. If desired, the finishing blade may be stepped slightly above the second roughing blade so as to take a light finishing cut. The characteristic arrangement of the blades, as indicated by the formula hereinbefore discussed, is preferably adhered to so that the desired fine finish of surface will result from a single pass of this tool across the work. While in working upon the harder metals it is desirable to provide a series of finishing blades with one or more roughing blades, this is not essential in dealing with softer metals such as aluminum. This is due to the fact that much higher cutting speeds are permissible in the turning of these softer metals. When the cutting speed is sufficiently high the revolution marks may readily be made to overlap, so that each blade, in effect, partially finishes its own previous cut. This makes it possible, under these conditions, to employ fewer finishing blades and even but a single finishing blade to produce a smooth surface. For example, in turning an aluminum piston, in the manner indicated in Fig. 9, at a cutting speed of 1000 feet per minute and a tool feed of 15 inches per minute, a finished surface, varying less than .0005 of an inch, may be produced by the series of three blades. This cutting speed and rate of tool feed may be varied considerably on either side of the values mentioned without materially affecting the finish produced. For example, surface speeds of between 800 and 1200 feet per minute and tool feeds of between 12 inches and 20 inches per minute will be found quite satisfactory under the conditions mentioned. Harder metals may similarly be turned to smooth surfaces by a fewer number of finishing blades if a sufficiently hard tool alloy is employed to permit high speed cutting of the character mentioned.

The factors upon which depends the production of a smooth finished surface may be summarized as follows:

1. The number of finishing blades employed.
2. The number of revolutions of the work in relation to a given rate of tool feed.
3. The width of blade edge which is effective or active at any given instant.

It will be clear from Fig. 3 and the formula explained in connection with it that the greater the number of finishing blades employed the less will be the burden placed upon each blade and the smoother will be the resulting surface. The ridges formed between successive revolution marks will be more uniformly reduced as the number of blades is increased. Obviously a limit may be reached beyond which the improvement in the smoothness of the surface due to the use of more blades is so negligible that it is impractical to use more. Ordinarily it will be found unnecessary and undesirable to employ more than eight finishing blades and in many instances a fewer number will be found quite adequate. Again, it will be clear that if a large number of revolutions of the work are permitted for each inch of advance of the cutter, there will be such an overlapping of the revolution marks, or successive cuts, that a smooth surface may be produced by a single blade. The width or length of the section of the blade edge which will be effective at a given time may depend upon several factors. For example, the angle of incidence of the blade to the work has its effect. If the blade is parallel with the work axis the entire blade edge is active at once and theoretically no revolution marks will be formed. As the angle between blade and work axis increases, the width of the active portion at any instant will decrease. This results in a rougher finish but at the same time reduces the load on the machine and cutter and relieves chattering. I have found it preferable to employ a major angle of incidence, as before stated, and to rely upon other factors to provide a work surface of desirable smoothness. As will be explained more fully later, the use of a circular type of cutter having a diameter nearly the same as that of the work surface insures a large arc of contact and hence will result in the production of a smooth surface.

In connection with the type of tool disclosed in Fig. 9, it should be understood that the right angular relation of the two blade blocks is not a requisite of this form of the invention. For instance, the blades may be arranged to lie in angularly related planes which are at more or less than ninety degrees to each other. When such other angles are employed it may be advantageous to use elongated blades of the same character in both portions of the block. The invention is susceptible of other modifications, as well. Various groups of blades may be arranged at different angles and in any case it is not required that any or all of the blades be of the straight type herein shown, but all or any group of them may be designed to produce a form cut on the work.

Obviously, various forms of apparatus may be designed for utilizing the tool and for carrying out the method of the present invention. Since particular machines for this purpose form the subject matter of applications which are about to be filed it does not appear that detailed illustration and description of such machines are necessary. Suffice it, therefore, to say in connection with the tools shown in Figs. 4 and 9, an apparatus may be provided which rotates the work and which simultaneously therewith passes the tool recto-linearly in a plane transverse the axis of rotation of work. In using the tool shown in Figs. 5 and 8, it will be understood that the apparatus will consist of means for rotating the work and means for moving the tool axially thereof and rotating it with respect to the work so as to successively present the cutting edges to either the internal or external work surface.

From the foregoing it will be seen that the present invention provides a novel and simple tool, and method particularly suited to the demands of economic production. It will be understood that the invention is not confined to the details of structural arrangement herein illustrated by way of example and numerous changes, modifications, and the full use of equivalents may be resorted to without departing from the spirit or scope of the invention as outlined in the appended claims.

Having thus set forth the nature of my invention, what I claim is:

1. A method of working metal which includes the steps of subjecting a rotating work piece to the successive actions of a plurality of roughing blades radially stepped with respect to each other and a plurality of non-stepped finishing blades by a single continuous rotary movement of a tool.

2. A method of turning metal which comprises rotating a work piece and revolving a multi-bladed cutter the blades of which extend from its axis different radial distances with respect to each other, to feed a cutting edge thereon into the surface of the work, the axis of rotation of the cutter passing within the circumference of the work.

3. A method of turning metal which comprises rotating a work piece at a cutting speed, rotating a cutter at a slow speed to feed a stepped series of elongated, spirally arranged blades into the path of the work surface, and maintaining the axis of rotation of the cutter eccentric to but within the circumferential limits of the work piece.

4. A method of turning metal to produce a finished surface which comprises the step of rotating the work at cutting speed and subjecting the work while rotating to the action of a rotating series of blades the edges of which are arranged in a radial spiral, the center of which is substantially but not exactly coincident with the axis of rotation of the work.

5. A method of turning metal to produce a finished surface which includes the step of rotating the work at cutting speeds and subjecting the work while rotating to the action of a rotating series of stepped cutting blades each of which moves in a circular path internally tangent to the surface of the work.

6. A method of turning metal which includes the step of rotating the work at cutting speed and subjecting the work to the successive action of a plurality of stepped blades each of which moves in a circular path encircling the work and tangent to the surface thereof.

7. A method of turning metal which includes the step of rotating the work at cutting speed and subjecting the work while rotating to the action of a stepped series of blades each of which move in a circle through which passes the axis of rotation of the work.

8. The method of turning metal which consists in subjecting the surface of the work to the successive action of a rotating series of blades of a step-bladed cutter, while the work and blade are moving with respect to each other at cutting speed, the axis of rotation of the cutter being within the confines of the work circumference.

9. A method of turning metal which consists in relatively rotating the work and a step-bladed cutter and feeding the blades successively to the work by rotating each blade to an angle of 360°.

Signed at Bridgeport, in the county of Fairfield and State of Connecticut this 30th day of June, A. D. 1932.

EDWARD C. BULLARD.

CERTIFICATE OF CORRECTION.

Patent No. 1,899,608. February 28, 1933.

EDWARD C. BULLARD.

It is hereby certified that error appears in the printed specification of the above numbered patent requiring correction as follows: In the drawings, sheet 3 containing Figures 10 and 11 should be canceled; page 6, lines 69, 70, and 71, strike out the words "and the apparatus employed may be similar to that illustrated in Fig. 10 of the drawing and to be subsequently described"; and that the said Letters Patent should be read with these corrections therein that the same may conform to the record of the case in the Patent Office.

Signed and sealed this 14th day of November, A. D. 1933.

F. M. Hopkins

Acting Commissioner of Patents.

(Seal)